May 15, 1962 W. H. BROWN 3,034,294
EXHAUST NOZZLE BURNING SUPERSONIC RAMJET
Filed Dec. 29, 1959 2 Sheets-Sheet 2

INVENTOR
WILLIAM H. BROWN
BY Vernon F. Hauschild
ATTORNEY

United States Patent Office 3,034,294
Patented May 15, 1962

3,034,294
EXHAUST NOZZLE BURNING SUPERSONIC RAMJET
William H. Brown, Riviera Beach, Fla., assignor to United Aircraft Corporation, East Hartford, Conn., a corporation of Delaware
Filed Dec. 29, 1959, Ser. No. 862,654
2 Claims. (Cl. 60—35.6)

This invention relates to fixed geometry, supersonic ramjet engines and more particularly to the introduction of a secondary combustion system to be utilized in the divergent portion of the convergent-divergent exhaust nozzle thereof during flight operation at speeds below the designed Mach number.

It has been found that when fixed geometry, supersonic ramjet engines operate at flight speeds below the designed Mach number, severe thrust loss and vehicle drag are encountered. It has also been found that there is a severe limitation upon the amount of heat which can be added in the primary combustion chamber in an attempt to overcome these disadvantages since the normal shock wave which is established in the vehicle diffuser inlet will be discharged forwardly from the vehicle if too much heat and hence pressure is added to the primary combustion chamber.

It is the object of this invention to teach a secondary combustion system in the divergent portion of a supersonic ramjet engine to prevent the normal shock in the diffuser inlet from "popping" during operation below design speed. It is a further object of this invention to provide a secondary combustion system in the divergent portion of a fixed geometry, supersonic ramjet engine for operation during flight operation below designed Mach number which will cause the exhaust nozzle to flow full without flow separation from the divergent portion of the nozzle to eliminate drag and which will further increase the temperature and velocities of the exhaust gases being discharged to atmosphere from the exhaust nozzle to greatly increase the thrust, while maintaining the velocity of the exhaust gas in the aforementioned divergent portion at Mach one.

It is a further object of this invention to teach a secondary combustion system in the divergent portion of a fixed geometry, supersonic ramjet which is actuatable in response to ramjet operation at conditions inferior to or below design conditions, for example, which secondary combustion system is responsive to ramjet engine Mach number, exhaust gas Mach number in the divergent portion of the ramjet exhaust nozzle, or the position of the normal shock wave in the ramjet diffuser inlet.

Other objects and advantages will be apparent from the specification and claims, and from the accompanying drawings which illustrate an embodiment of the invention.

Figure 1:
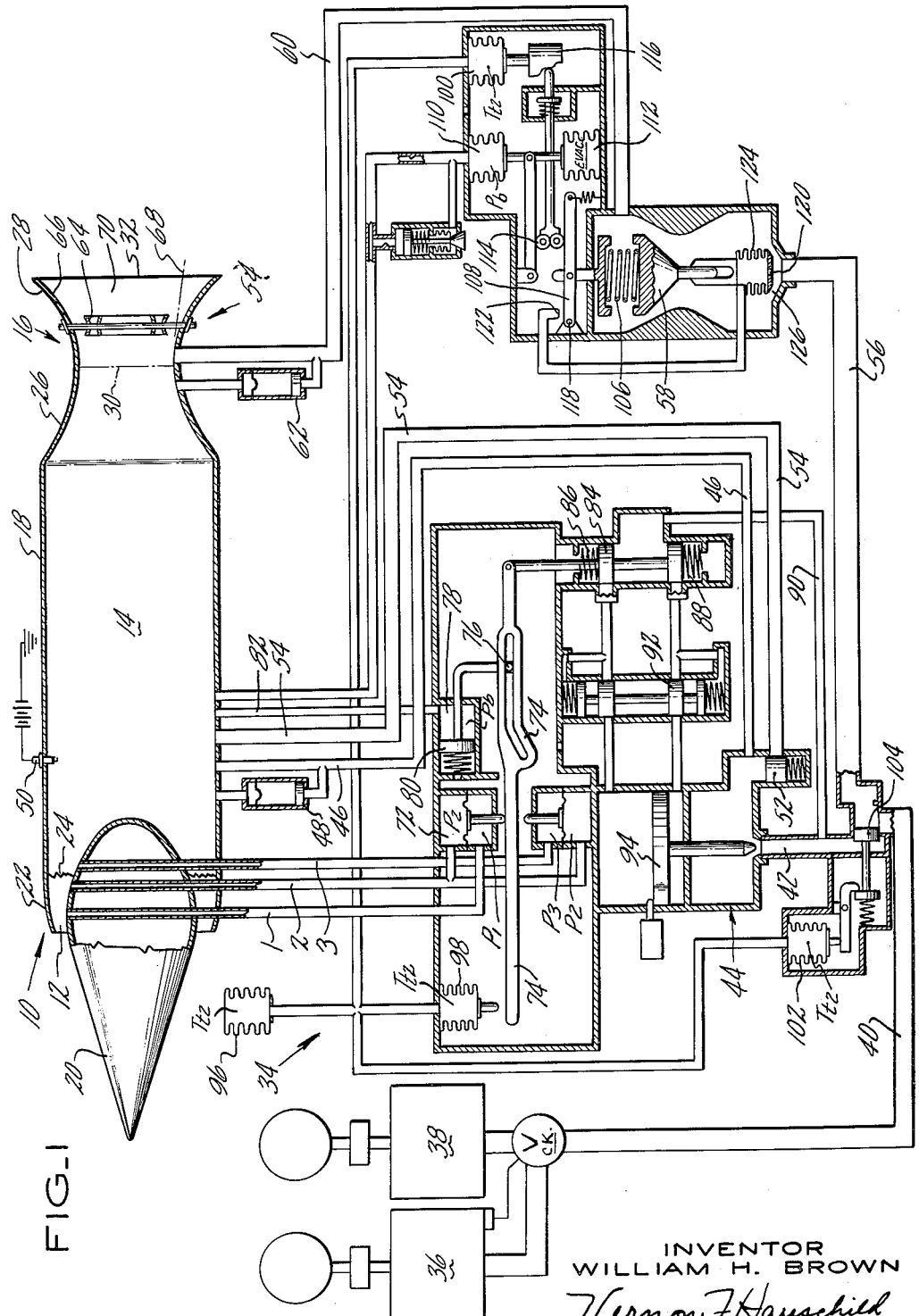
FIG. 1 is a cross-sectional showing of a fixed geometry, supersonic ramjet having both a primary and a secondary combustion system.

Referring to FIG. 1 we see fixed geometry, supersonic ramjet 10 which comprises a fixed geometry diffuser inlet 12, primary combustion chamber or zone 14 and convergent-divergent exhaust nozzle 16, all concentrically enveloped within ramjet casing 18, which is preferably of circular cross section. Supersonic inlet 12 preferably includes center body 20 partially enveloped within the forward portion 22 of casing 18 so as to form a supersonic inlet through which atmospheric air enters ramjet 10 to establish a normal shock wave indicated generally at 24 therein. It will be obvious to those skilled in the art that inlet 12 may be an isentropic spike inlet for high Mach number flight installations and may even be the typical diverging diffuser inlet for Mach number flights installations slightly in excess of one. Exhaust outlet 16 consists of convergent upstream or forward portion 26, divergent downstream or after portion 28, throat or minimum cross-sectional area region 30 and exhaust gas outlet 32.

Air enters the ramjet diffuser inlet 12, which inlet performs the function of the compressor in a turbojet engine, is burned and has energy added thereto in passing through primary combustion chamber 14 and is exhausted to atmosphere through outlet 32 of convergent-divergent exhaust nozzle 16 to perform a thrust generating function for ramjet 10.

Fuel is provided to primary combustion chamber 14 and to secondary combustion chamber 70 by fuel control system 34. Fuel is provided to system 34 from fuel tanks 36 and 38, which may be pressurized or which may have pumps associated therewith for fuel pumping purposes. Fuel leaving these pumps passes through line 40 and thence either through one of two paths depending upon the position of transfer valve 104, the first pass being through line 42, main fuel metering valve 44, and primary fuel line 46 into combustion chamber 14. The fuel from primary fuel line 46 may act upon plunger system 48 to cause ignitor fuel, preferably pyrophoric, to be discharged into the main combustion chamber 14. Obviously, an ignitor system such as battery and spark plug unit 50 may also be used. When the fuel pressure in primary fuel line 46 exceeds a predetermined value, float 52 actuates to inaugurate fuel flow through secondary fuel line 54 into combustion chamber 14 along with the fuel flow through primary fuel line 46. Fuel from line 40 may also pass through a second path, namely through line 56, afterburner fuel throttle valve 58, thence through line 60 into secondary combustion chamber 70. Plunger system 62 acts to introduce ignitor fuel, again preferably pyrophoric, into the secondary combustion chamber 70 in the fashion previously described in connection with element 48. It may be deemed desirable to use flameholders 64 in secondary combustion chamber 70, preferably, of the non-flow blockage type taught in U.S. Patent No. 2,938,344.

With respect to the flow of fuel to the main combustion chamber 14, it will be noted in FIG. 1 that pressure taps 1, 2 and 3, which are indicative of the position of normal shock 24 provide pressure readings to bellows system 72, to cause the bellows system to act upon pivotable beam 74 as a function of shock wave position. The pivot point 76 of pivotable beam 74 is positioned by burner pressure limiter and rate selector mechanism 78, which comprises piston 80 connected to and positioned by burner pressure ($P_b$) through tap 82. The motion of lever 74 causes servo valve 84 to translate in opposition to the centering force imparted thereto by springs 86 and 88 and to permit the fuel from lines 42 and 90 to pass to either side of the metering valve lock 92 and to thereby move lock 92 from its spring biased neutral or lock position to a second position so that fuel may pass selectively to the top or bottom of piston 94, whose movement determines the area defined by throttle 44. When beam 74 returns to its neutral position, valves 84 and 92 will so return as to hydraulically lock throttle valve 44.

It is imperative in all supersonic ramjet installations that the device not perform at speeds in excess of design speed so as to avoid thermal destruction. Accordingly, total inlet temperature ($T_{t2}$) bellows is positioned at inlet 12 and constitutes a rough indication of Mach number or flight speed. Bellows 96 is selected so that it will act upon joined bellows 98 to reduce fuel flow to the main combustion chamber and upon joined bellows 100 to reduce fuel flow to the secondary combustion chamber when the destructive speed is approached. Further, bellows 96 acts upon joined bellows 102 to actuate transfer valve 104 and hence cut out afterburner operation when design speed is reached.

Considering the flow of fuel to the secondary combustion chamber 70, we note that the fuel which passes through line 56 is regulated in passing through throttle valve 58 and that the position of throttle valve 58 is determined by the pressure of the fuel acting on the bottom side thereof and the pressure of spring 106 acts on the top thereof. Beam 108 imparts the positioning force to spring 106 as a result of pressure applied thereto in the form of a force driven from opposed burner pressure bellows 110 and evacuated bellows 112. These opposed bellows impart a force to beam 108 through roller unit 114. The position of roller unit 114 is determined by total inlet temperature responsive bellows 100 which acts through 3-D cam 116 to position roller unit 114. Accordingly, the torque imparted to beam 108 to cause it to pivot about pivot point 118 is caused by the force created by bellows 110 and 112 and the position established by bellows 100. As beam 108 is caused to pivot about pivot point 118, the force on spring 106 varies and hence the position of throttle valve 58 varies. Throttle valve 58 is caused to return to its steady state position by the return force created by fuel passing through fixed orifice 120 and variable orifice 122, whose area is determined by the position of beam 108 and which serves to vary the pressure within bellows 124, which bellows regulates the flow of fuel through area 126 and hence imparts a return force to the bottom of throttle valve 58.

Casing 18 of supersonic, fixed geometry ramjet 10 is designed for optimum performance at a selected design Mach number. When ramjet 10 is operating at the designed Mach number or flight speed, normal shock 24 is positioned safely in inlet diffuser 12 between probes 2 and 3 and the exhaust gases passing through exhaust nozzle 16 expand along the inner surface 66 of nozzle divergent portion 28 to generate the thrust required to maintain designed Mach number or flight speed. The required thrust variations to maintain designed Mach number are brought about for fuel flow variations to primary combustion chamber 14.

When ramjet 10 operates below designed Mach number, during launching for example, the amount of air being rammed through diffuser inlet 12 decreases and hence the amount of exhaust gas being discharged to atmosphere through exhaust nozzle 16 also decreases. The decrease in exhaust gas flow through exhaust nozzle 16 causes the exhaust gases to separate, as shown in phantom in FIG. 1 at 68, from wall 66 of the exhaust nozzle 16. This flow separation causes a thrust reduction and permits atmospheric air to contact the separated areas on surface 66 so as to establish vehicle drag and hence further reduce the net thrust of the vehicle. Beyond this, the reduced velocity of the separated exhaust gases causes a further reduction in the thrust generated by ramjet 10. To overcome this thrust loss, it would ordinarily be necessary to increase the flow of fuel into primary combustion chamber 14 and thereby increase the heat imparted to the air passing therethrough so that it will expand against expansion and thrust generating surface 66 due to its added energy, however, the addition of fuel to main combustion chamber 14 will increase the pressure therein and if such increase is sufficient it will cause normal shock wave 24 to be pushed forwardly or "popped" out of diffuser inlet 12, thereby completely destroying the action of inlet 12 so that it no longer performs a diffusing and hence pressure generating function.

To avoid the necessity of adding additional fuel and hence heat and pressure in primary combustion chamber 14 to correct the exhaust nozzle flow separation malady previously described and hence running the risk of expelling the normal shock wave, it is my invention that a secondary combustion chamber 70 be established in the divergent portion 28 of exhaust nozzle 16 during flight operation below designed speed. The heat and energy which will be added to to the extent gases in secondary combustion chamber 70 will not only increase their velocity and thence their thrust generating capabilities upon discharge to atmosphere, but will also cause them to expand and recontact expansion and thrust generating surface 66 to improve thrust and eliminate the drag condition caused by flow separation. It will be noted that secondary combustion chamber 70 performs the function of increasing thrust and eliminating drag at ramjet flight speeds below designed Mach number so as to maintain throat 30 choked and the Mach number of the exhaust gases pass through divergent portion 28 at one. By so doing, secondary combustion unit 54 does not cause an increase of pressure in primary combustion chamber 14 and hence does not tend to cause normal shock 24 to be expelled forwardly from diffuser inlet 12.

Figure 3:
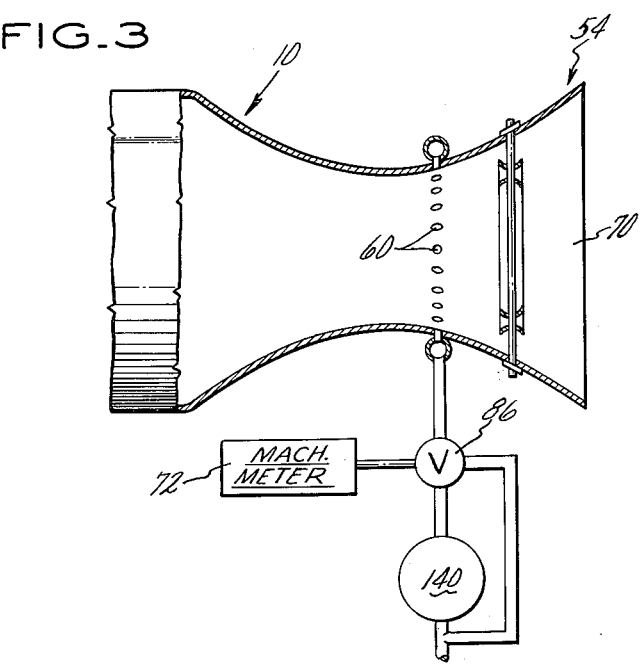
FIG. 3 is a further modification in which the secondary combustion system is operated as a function of vehicle Mach number.

As best shown in the FIG. 3 modification, secondary combustion unit may be actuated so as to cause fuel to be injected into secondary combustion chamber 70 by the action of Mach meter 72 actuating fuel valve 86 on the line. With this configuration alone used, secondary combustion system 54 will be brought into play every time that ramjet 10 falls below designed Mach number.

Figure 2:
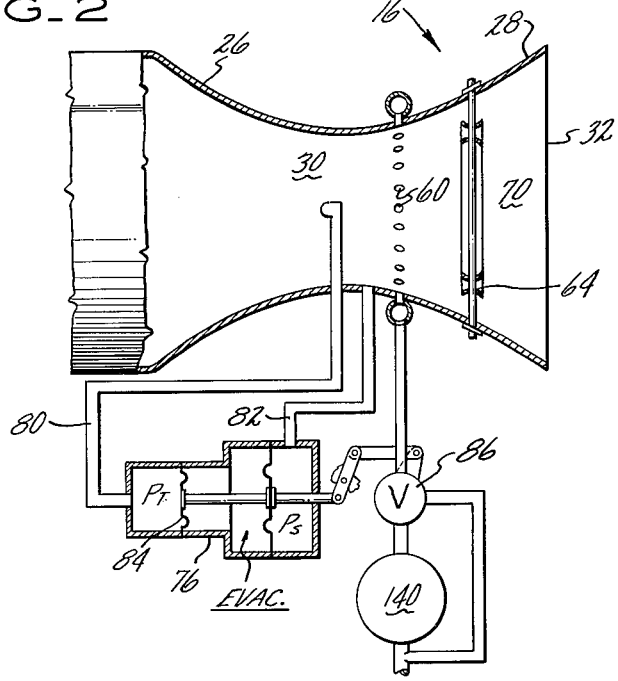
FIG. 2 is a modification of the secondary combustion system control means wherein the fuel flow in the secondary combustion system is responsive to the Mach number of the exhaust gases passing through the exhaust nozzle divergent portion.

A preferred embodiment of my invention is shown in FIG. 2 wherein special Mach meter 76, which compares the total pressure in line 80 and the static pressure in line 82 through a diaphragm system 84 to position valve 86 and hence regulate the flow of fuel from pump 140 into secondary combustion chamber 70 as a function of the Mach number of the exhaust gases being passed through divergent section 28 of exhaust nozzle 16 so as to maintain exhaust gas Mach number at one. Special Mach meter 76 is described more fully in U.S. Patent No. 2,739,444 to which reference is hereby made.

It will be obvious to those skilled in the art that special Mach meter could actuate pump 140 individually or together with flow regulating valve 86.

It is to be understood that the invention is not limited to the specific embodiment herein illustrated and described but may be used in other ways without departure from its spirit as defined by the following claims.

I claim:

1. The method of increasing the low flight speed thrust output of a supersonic ramjet engine having a fixed convergent-divergent exhaust nozzle without expelling the inlet shock wave comprising providing sustained combustion in the main combustion chamber to approach the limit of inlet shock expulsion and then providing additional sustained combustion in the diverging section of the convergent-divergent exhaust nozzle to supplement the main combustion.

2. The method of increasing the low flight speed thrust output of a supersonic ramjet engine having a fixed convergent-divergent exhaust nozzle without expelling the inlet shock wave comprising providing sustained combustion in the main combustion chamber to approach the limit the inlet shock expulsion and providing additional sustained combustion in the diverging section of the convergent-divergent exhaust nozzle to supplement the main combustion.

References Cited in the file of this patent

UNITED STATES PATENTS

| | | |
|---|---|---|
| 2,479,777 | Price | Aug. 23, 1949 |
| 2,512,790 | Cleveland | June 27, 1950 |
| 2,653,445 | Halford et al. | Sept. 29, 1953 |
| 2,763,983 | Kafka | Sept. 25, 1956 |
| 2,766,581 | Welsh | Oct. 16, 1956 |
| 2,861,419 | Hausmann | Nov. 25, 1958 |
| 2,861,420 | Lewis | Nov. 25, 1958 |
| 2,952,123 | Rich | Sept. 13, 1960 |

OTHER REFERENCES

"Analysis of Heat Addition in a Convergent-Divergent Nozzle" by Hearth and Perchonok, N.A.C.A. Technical Note 2938, Washington, April 1953, pages 1–18, page 8 relied upon.

UNITED STATES PATENT OFFICE
CERTIFICATE OF CORRECTION

Patent No. 3,034,294            May 15, 1962

William H. Brown

It is hereby certified that error appears in the above numbered patent requiring correction and that the said Letters Patent should read as corrected below.

Column 5, line 1, for "the" read -- of --.

Signed and sealed this 4th day of September 1962.

(SEAL)
Attest:

ERNEST W. SWIDER
Attesting Officer

DAVID L. LADD
Commissioner of Patents